United States Patent [19]

Zaunberger et al.

[11] 4,280,579
[45] Jul. 28, 1981

[54] CONTROL FOR TRACKED VEHICLE STEERING MECHANISM

[75] Inventors: Franz X. Zaunberger, Augsburg; Artur Kugler, Neusass, both of Fed. Rep. of Germany

[73] Assignee: Zahnraderfabrik Renk Aktiengesellschaft, Fed. Rep. of Germany

[21] Appl. No.: 112,910

[22] Filed: Jan. 17, 1980

[30] Foreign Application Priority Data

Jan. 19, 1979 [DE] Fed. Rep. of Germany ....... 2901958

[51] Int. Cl.³ .............................................. B62D 11/10
[52] U.S. Cl. .................................... 180/6.44; 180/6.7; 60/449
[58] Field of Search .................. 180/6.44, 6.2, 6.3, 180/6.7; 60/449

[56] References Cited

U.S. PATENT DOCUMENTS

| 3,371,734 | 3/1968 | Zaunberger | 180/6.44 |
| 3,392,602 | 7/1968 | Frost | 180/6.44 |

FOREIGN PATENT DOCUMENTS

| 860601 | 10/1952 | Fed. Rep. of Germany . |
| 1174182 | 7/1964 | Fed. Rep. of Germany . |
| 2322457 | 11/1974 | Fed. Rep. of Germany . |
| 1480725 | 1/1976 | Fed. Rep. of Germany . |
| 1929380 | 6/1977 | Fed. Rep. of Germany . |

Primary Examiner—John P. Silverstrim
Attorney, Agent, or Firm—Natter & Natter

[57] ABSTRACT

A tracked vehicle includes an engine driven transmission having a pair of output shafts, each of which engages a planetary gear set for driving chain treads. An infinitely variable, hydrostatic/hydrodynamic, superimposed steering mechanism includes a neutral shaft in engagement with the sun gears of each of the planetary gear sets. The steering mechanism includes a hydrostatic drive unit with a regulating pump having a control lever operatively connected to the vehicle steering wheel and an oil motor having an absorption regulating lever. The steering mechanism also includes a hydrodynamic drive unit which is controlled as a function of the hydrostatic system pressure. Output gears of both steering drive units engage the neutral shaft. A torque control valve includes a plunger which positions the oil motor absorption lever as a function of the hydrodynamic drive speed to increase torque at low drive speeds and reduce torque at high drive speeds. The speed dependent position of the control valve plunger is overridden in the presence of high pressures in the hydrostatic drive unit to increase torque when necessary at high speeds.

13 Claims, 1 Drawing Figure

4,280,579 ns with hydrostatic drive units designed for maximum output torque at minimum oil motor absorption quantity or for maximum oil motor output speed at full absorption quantity. In either event, the hydrostatic units required pumps and motors of large size and substantial weight and cost.

CONTROL FOR TRACKED VEHICLE STEERING MECHANISM

BACKGROUND OF THE INVENTION

1. Field of the Invention

This invention relates generally to steering controls for tracked vehicles such as tanks and more specifically to an automatically variable torque control for a hydrostatic drive unit which engages a neutral shaft in a steering mechanism.

2. Brief Description of the Prior Art

Prior steering mechanisms for tracked vehicles which include hydrostatic and/or hydrodynamic units for driving a neutral shaft have been disclosed in U.S. Pat. No. 3,371,734, issued Mar. 15, 1968 and in the following published German patent applications: DE-PS No. 860,601; DE-PS No. 1,480,725; DAS No. 1,929,380; DOS No. 23 22 457; and DAS No. 1,174,182. In these prior superimposed steering mechanisms, control of the hydrostatic drive unit through control of a hydrostatic pump regulating lever and/or an oil motor absorption quantity valve was provided as a function of the steering wheel position. As such, torque requirements of the steering drive mechanism and the torque characteristics of a hydrodynamic drive unit which may also engage the neutral shaft were not considered.

Since the torque requirements for the steering drive were not solely dependent upon the position of the vehicle steering wheel but were also a function of the friction between the chain tread and the terrain or road, it was necessary to provide such prior steering mechanisms with hydrostatic drive units designed for maximum output torque at minimum oil motor absorption quantity or for maximum oil motor output speed at full absorption quantity. In either event, the hydrostatic units required pumps and motors of large size and substantial weight and cost.

SUMMARY OF THE INVENTION

The present invention relates to an automatic control device for adjusting the oil motor absorption quantity control in a hydrostatic drive unit which drives a neutral shaft of a tracked vehicle steering mechanism. A hydrodynamic drive unit also engages the neutral shaft with the hydrodynamic unit being driven by the vehicle engine. An oil pump is driven by the engine, and its output varies as a function of the drive speed of the hydrodynamic unit. The oil pump fluid is fed to a control valve which is linked to the oil motor absorption quantity lever. The control valve includes a plunger which is spring biased so that at low engine speeds the absorption lever is positioned for full absorption and maximum output torque. Increased hydrodynamic drive speed provides increased oil pump pressure which moves the valve plunger to change the absorption lever position increasing the output speed of the hydrostatic drive.

An additional control for the purpose of increasing the absorption of the oil motor as a function of the pressure in the hydrostatic drive unit is provided. The additional control includes a fluid line from the hydrostatic drive unit to the control valve so that increased pressure in the hydrostatic drive unit will urge the valve plunger to position the absorption lever for greater torque and overrides the oil pump pressure in the control valve.

From the foregoing summary, it will be appreciated that it is an object of the present invention to provide an improved superimposed steering mechanism for a tracked vehicle of the general character described which is not subject to the disadvantages of the prior steering mechanisms.

A further object of the present invention is to provide an improved steering mechanism for a trackless vehicle of the general character described which automatically varies the transmittable torque as a function of drive speed.

Another object of the present invention is to provide an improved steering mechanism for a trackless vehicle of the general character described which meets torque requirements at varying drive speeds yet employs relatively small, lightweight drive units.

A still further object of the present invention is to provide an improved steering mechanism for a trackless vehicle of the general character described which is relatively low in cost, while providing increased output capacity.

Another object of the present invention is to provide an improved steering mechanism for trackless vehicles of the general character described which includes a control for automatically varying the output of a hydrostatic drive unit oil motor as a function of the drive speed of a hydrodynamic drive unit.

A further object of the present invention is to provide an improved steering mechanism for trackless vehicles of the general character described which includes a hydrostatic drive unit, a hydrodynamic drive unit and a control mechanism for automatically optimizing the output distribution between the drive units.

Other objects of the present invention in part will be obvious and in part will be pointed out hereinafter.

With these ends in view, the invention finds embodiment in certain combinations of elements and arrangements of parts by which the objects aforementioned and certain other objects are hereinafter attained, all as more fully described with reference to the accompanying drawings and the scope of which is more particularly pointed out and indicated in the appended claims.

BRIEF DESCRIPTION OF THE DRAWING

In the accompanying drawing in which is shown one of the various possible exemplary embodiments of the invention.

DESCRIPTION OF THE PREFERRED EMBODIMENT

Figure 1:
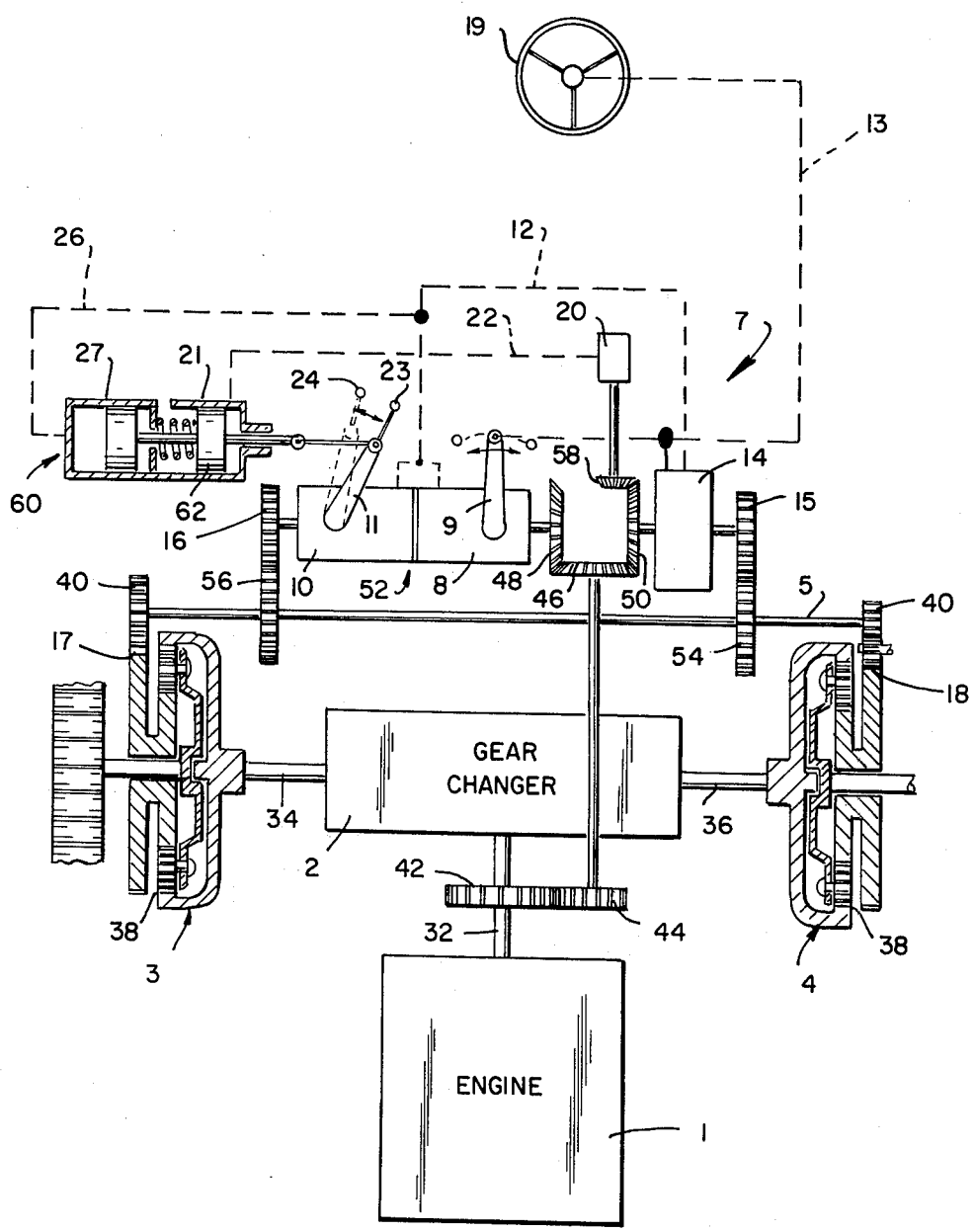
FIG. 1 is a schematized diagram of a tracked vehicle transmission including an improved hydrostatic/hydrodynamic superimposed steering mechanism constructed in accordance with and embodying the invention and showing a control valve for adjusting the position of the control lever of a hydrostatic drive unit oil motor as a function of drive speed and hydrostatic system pressure.

Referring now in detail to the drawing, the reference numeral 1 denotes generally a motor or engine for a tracked vehicle. The engine 1 includes an output shaft 32 which drives a gear shift mechanism 2. The gear shift mechanism 2 includes a pair of output shafts 34, 36 each of which drives a planetary gear set 3, 4, respectively, by engagement with an annulus 38. A sun gear 17, 18 of each of the planetary gear sets 3, 4, respectively, is in driving engagement with a pinion gear 40 fixed at opposite ends of a neutral shaft 5 of a steering mechanism 7.

The steering mechanism 7 and transmission drive herein described is an infinitely variable hydrostatic/hydrodynamic superimposed vehicle steering unit such as that disclosed in U.S. Pat. No. 3,371,734, issued Mar. 15, 1968 to the assignee of the present invention and in the following published German patent applications which are incorporated herein by reference: DE-PS No. 860,601; DE-PS No. 1,480,725; DAS No. 1,929,380; DOS No. 23 22 457; and DAS No. 1,174,182. Such transmission units are available from Zahnraderfabrik Renk Aktiengesellschaft of Augsburg, West Germany, the assignee of the present invention, and are typically employed in tracked vehicles such as battle tanks and armored personnel carriers.

The steering mechanism 7 is driven by a gear train which includes a pinion 42 fixed to the output shaft 32 which drives a further pinion 44 fixed to a shaft 6. The shaft 6, in turn, drives a bevel gear 46 which engages a pair of bevel gears 48, 50. The bevel gear 48 drives a hydrostatic steering drive unit 52 including a hydrostatic regulating pump 8 having a delivery lever 9 and an oil motor 10 having an absorption regulating lever 11.

The steering mechanism 7 additionally includes a hydrodynamic drive unit 14 which is driven by the bevel gear 50. The hydrodynamic drive unit includes an output shaft having a pinion 15, while the output of the hydrostatic drive unit 52 comprises an output shaft of the oil motor 10 which drives a pinion 16. The output pinions 15, 16 of the hydrodynamic drive unit and the hydrostatic drive unit engage a pair of pinions 54, 56, respectively, of the neutral shaft 5. The hydrodynamic drive unit 14 provides a variable coupling between the shaft 6 and the pinion 15 and prevents the oil motor 10 from overloading when the neutral shaft rotates at high speed.

Steering control of the tracked vehicle is achieved through a linkage 13 between a vehicle steering wheel 19 and the hydrostatic pump control lever 9. The linkage 13 may be hydraulic, electrical or mechanical. In addition, the hydrodynamic drive unit 14 is adjustable as a function of the internal pressure state of the hydrostatic drive unit 52 through a fluid line 12. The hydrodynamic drive unit 14 couples the shaft 6 and the pinion 15 at a variable rate as controlled by the oil motor 10 through the line 12 and/or the steering control linkage 13. When the vehicle is turning, the steering control linkage 13 adjusts the hydrodynamic drive unit 14 for reduced coupling rate (slipping) between the engine driven shaft 6 and the neutral shaft 5. When the vehicle is travelling straight, the hydrodynamic drive unit is adjusted for direct drive without energy loss.

The transmission and steering control previously described is of conventional design and known to those of skill in the art. In operation, the engine 1 drives each output shaft 34, 36 in the same direction to rotate the annulus 38 of each planetary gear set 3, 4. If the vehicle is driving along a straight path, the neutral shaft 5 does not rotate. Thus, the sun gears 17, 18 are prevented from rotating. As a result, the cages which carry the planet gears and drive the chain treads will be driven in the same direction.

If the vehicle is to drive along a curved path, the oil motor 10 of the hydrostatic drive unit 52 and the hydrodynamic drive unit 14 drive the neutral shaft 5 in either of two directions of rotation depending upon the direction of vehicle turn desired. As shown in the drawing, when the neutral shaft 5 rotates, it drives the sun gears 17, 18 in opposite directions due to an idler gear which interconnects one of the pinions 40 with the sun gear 18.

In order to rotate the neutral shaft 5 in opposite directions, the hydrodynamic drive unit 14 includes a reversing gear and two alternatively used hydrodynamic couplings or clutches as described in the previously referred to German Letters Pat. No. 1,480,725 and corresponding U.S. Pat. No. 3,371,734.

In accordance with the present invention, an automatic control is provided to adjust the output torque of the system to meet the requirements of the vehicle when the steering wheel 19 is turned. As such, the instantaneous torque requirements of the steering mechanism are dependent upon vehicle speed and friction conditions between the chain treads and the terrain.

Pursuant to the present invention, an oil pump 20 is driven by the hydrodynamic input bevel gear 50 through a bevel gear 58 such that its output fluid pressure varies as a function of the speed of the hydrodynamic input gear 50. The oil pump 20 is interconnected with a control valve 60 through a fluid line 22. The control valve 60 carries a double piston plunger 62 which is linked to the oil motor absorption regulating lever 11.

An internal spring 25 urges the plunger 62 to move the regulating lever 11 toward the position 23 shown in solid lines in the drawing. This is the position for full absorption and high torque output. At low hydrodynamic drive speed with low fluid pressure in the oil pump 20 and the line 22 and the absorption regulating lever 11 positioned at 23, the oil motor output will be at maximum torque and minimum speed.

When the engine speed increases, the oil pump, driven through the gear train comprising the gears 42, 44, 46, 50 and 58 increases speed and output. This urges fluid in the control valve against one piston of the plunger 62 to move the plunger 62 against the spring force and adjust the regulating lever 11 to a lower setting such as at 24 for reduced torque output and higher oil motor output speed.

The automatic control of the present invention not only varies the torque of the steering mechanism as a function of the driving speed but, in addition, is designed to provide increased torque output when necessary even at high driving speeds. For this purpose, the control valve 60 has an additional fluid input at the other piston of the plunger 62. A fluid line 26 interconnects this input of the control valve with the fluid line 12 and, as such, increased pressure in the hydrostatic system will result in fluid pressure being exerted on the plunger 62 to urge the plunger toward the spring biased position with the lever 11 at 23 for maximum torque output.

It will be appreciated that the fluid pressure in the fluid line 26 will be greater than the fluid pressure in the fluid line 22 in instances where the hydrostatic system pressure is to control the operation of the piston and override the speed dependent control through the oil pump 20.

The control valve 60 is illustrated as comprising two cylinders. The first cylinder 21 includes one piston of the plunger 62 and the spring 25 and receives the oil pump pressure through the line 22 to urge the plunger against the spring 25. The second cylinder 27 of the control valve 60 receives fluid through the line 26 and is designed to force the plunger against the fluid pressure in the cylinder 21 to override any torque reduction which is a function of drive speed.

From the foregoing, it will be seen that the present invention utilizes an automatic control which regulates the absorption control of the oil motor 10 in response to changes in a characteristic of the hydrodynamic drive unit 14, and in particular in response to changes in the drive speed of the hydrodynamic drive unit. Thus, at increasing hydrodynamic drive speed wherein the hydrodynamic unit is at high output capacity, the absorption control of the oil motor 10 is reduced so that the oil motor output speed is increased and output torque decreased. The decrease in oil motor output torque upon such occurrence is not of significance because the decreased torque output occurs only when the hydrodynamic drive is operating in a range of high output capacity.

Accordingly, the present invention optimizes the output distribution between the hydrostatic drive unit and the hydrodynamic drive unit so that, when the hydrodynamic drive unit is operating in a range of high torque transmission, the transmittable torque in the hydrostatic drive unit is reduced and its output speed increased. When the hydrodynamic drive unit 14 is operating in a range of low torque transmission capacity because of reduced input drive speed, the transmittable torque output of the hydrostatic drive unit 52 is increased. Thus, the capabilities of the hydrostatic drive unit and the hydrodynamic drive unit are maximized so that optimum performance is obtained while drive units of reduced size and cost may be employed.

Furthermore, as previously described, when increased output torque of the oil motor is necessary during extremely high loads at increased drive speed, the fluid line 26 permits increased pressure in the hydrostatic system to override any torque reduction in the oil motor output which is a function of the hydrodynamic drive speed.

It should be appreciated that the automatic torque control of the present invention is equally applicable to steering mechanisms which employ only a hydrostatic drive unit to drive the steering neutral shaft or a hydrostatic-mechanical superimposed steering drive.

Thus, it will be seen that there is provided a control for tracked vehicles steering mechanism which achieves the objects of the present invention and is well adapted to meet the conditions of practical use.

As various changes might be made in the invention as above set forth, it is to be understood that all matter herein described or shown in the accompanying drawing is to be interpreted as illustrative and not in a limiting sense.

Having thus described the invention, there is claimed as new and desired to be secured by Letters Patent:

1. In a tracked vehicle transmission having planetary gear sets for engagement with chain treads and a steering mechanism including a neutral shaft in engagement with the planetary gear sets, a hydrostatic drive unit comprising a hydrostatic pump and means regulating the hydrostatic pump as a function of a steering direction control, the hydrostatic drive unit further including an oil motor having an absorption control, the oil motor being in driving engagement with the neutral shaft, the improvement comprising an automatic torque control device, the control device including drive speed indicating means and means for adjusting the oil motor absorption control, the adjusting means being interconnected to the speed indicating means, the adjusting means including means for varying the absorption control as a function of the indicated drive speed.

2. A tracked vehicle transmission constructed in accordance with claim 1 wherein the varying means includes means for increasing the oil motor absorption rate in the presence of a low indicated speed and decreasing the oil motor absorption rate in the presence of a high indicated speed.

3. A tracked vehicle transmission constructed in accordance with claim 1 wherein the control means includes means sensing the pressure in the hydrostatic control unit, the adjusting means including means for varying the absorption control as a function of the pressure in the hydrostatic drive unit.

4. A tracked vehicle transmission constructed in accordance with claim 3 wherein the varying means includes means for increasing the oil motor absorption rate upon the hydrostatic system pressure exceeding a predetermined level.

5. A tracked vehicle transmission constructed in accordance with claim 3 wherein the varying means includes means for varying the oil motor absorption rate as a function of the hydrostatic system torque.

6. A tracked vehicle transmission constructed in accordance with claim 5 wherein the varying means includes means for increasing the oil motor absorption rate upon the hydrostatic system torque exceeding a predetermined level.

7. A tracked vehicle transmission constructed in accordance with claim 1 wherein the adjusting means comprises a control valve and the speed indicating means comprises a fluid pump, the automatic torque control device further including a fluid line interconnecting the fluid pump and the control valve.

8. A tracked vehicle transmission constructed in accordance with claim 1 wherein the steering mechanism includes a hydrodynamic drive unit in engagement with the neutral shaft.

9. A tracked vehicle transmission constructed in accordance with claim 8 wherein the drive speed indicating means is in engagement with the hydrodynamic drive unit and indicates the input speed of the hydrodynamic drive unit.

10. A method for controlling the torque output of a tracked vehicle steering mechanism, the steering mechanism comprising a neutral shaft in engagement with a pair of planetary gear sets and a hydrostatic drive unit, the drive unit comprising a hydrostatic pump controlled as a function of the position of an operator steering control and an oil motor having an absorption control, the oil motor including an output shaft in engagement with the neutral shaft, the method comprising the steps of sensing the engine drive speed and setting the absorption control for maximum oil motor output torque in the presence of a minimum drive speed, setting the oil motor absorption control for minimum oil motor torque output in the presence of a maximum drive speed, and setting the absorption control at various positions functionally proportionate to the vehicle drive speed when the sensed speed is intermediate the maximum and minimum speeds.

11. A method for controlling the output of a tracked vehicle steering mechanism as set forth in claim 10 further including the step of sensing the hydrostatic drive unit pressure and setting the absorption control to increase the oil motor torque output when the hydrostatic pressure exceeds a predetermined value.

12. A method for controlling the torque output of a tracked vehicle steering mechanism in accordance with claim 11 further including the step of overriding an absorption control setting which is a function of the drive speed when the sensed hydrostatic system pressure exceeds a predetermined value and setting the absorption control for greater oil motor torque output.

13. A method for controlling the output of a tracked vehicle steering mechanism as set forth in claim 10 wherein the steering mechanism further comprises a hydrodynamic drive unit in engagement with the neutral shaft, the hydrodynamic pump being driven by the engine, the engine drive speed being sensed by sensing the input drive speed of the hydrodynamic drive unit.

* * * * *